（12）United States Patent
Fortmann et al.

(10) Patent No.: US 7,606,638 B2
(45) Date of Patent: Oct. 20, 2009

(54) WIND PARK WITH ROBUST REACTIVE POWER ADJUSTMENT SYSTEM AND METHOD FOR THE OPERATION THEREOF

(75) Inventors: Jens Fortmann, Berlin (DE); Heinz-Hermann Letas, Gross Meinsdorf (DE)

(73) Assignee: REpower Systems AG, Hamburg (DE)

( * ) Notice: Subject to any disclaimer, the term of this patent is extended or adjusted under 35 U.S.C. 154(b) by 173 days.

(21) Appl. No.: 11/664,460

(22) PCT Filed: Sep. 30, 2005

(86) PCT No.: PCT/EP2005/001060

§ 371 (c)(1),
(2), (4) Date: Apr. 2, 2007

(87) PCT Pub. No.: WO2006/042572

PCT Pub. Date: Apr. 27, 2006

(65) Prior Publication Data

US 2008/0073912 A1     Mar. 27, 2008

(30) Foreign Application Priority Data

Oct. 1, 2004   (DE) .................. 10 2004 048 341

(51) Int. Cl.
 *H02J 3/38*   (2006.01)
 *F03D 9/00*   (2006.01)
(52) U.S. Cl. ........................................ 700/287; 290/44
(58) Field of Classification Search ................. 700/287, 700/286, 297; 290/44, 55
See application file for complete search history.

(56) References Cited

U.S. PATENT DOCUMENTS 7,095,597 B1 * 8/2006 Cousineau .................... 361/20

(Continued)

FOREIGN PATENT DOCUMENTS

DE         197 19 308         11/1998

(Continued)

OTHER PUBLICATIONS

Tapia, A., et al. (2004). "Reactive Power Control of Wind Farms for Voltage Control Applications," Renewable Energy 29: 377-392.

(Continued)

*Primary Examiner*—Albert DeCady
*Assistant Examiner*—Steven R Garland
(74) *Attorney, Agent, or Firm*—Morrison and Foerster LLP

(57) ABSTRACT

A windpark includes at least two wind energy installations, each of which installations comprises a rotor, a generator driven by the rotor and a control device, and which are connected via connecting lines to a main line. The windpark also includes a linking point which connects the main line to a power transmission network, a parkmaster which is configured for power factor control and has communication lines for transmission of control signals to the wind energy installations, and a power-factor control section including a distributed regulator having a higher-level regulator located at the parkmaster which is configured to determine a nominal voltage in order to set a global power coefficient for the power which is emitted to the power transmission network and to emit the nominal voltage as a signal via the communication lines and lower-level regulators at the wind energy installations.

12 Claims, 2 Drawing Sheets

U.S. PATENT DOCUMENTS

2007/0266423 A1* 11/2007 Tehee, Jr. ........................ 726/3

FOREIGN PATENT DOCUMENTS

| | | |
|---|---|---|
| DE | 100 20 635 | 3/2001 |
| EP | 1 159 040 | 3/2005 |
| EP | 1 512 869 A1 | 3/2005 |
| WO | WO 01/73518 A1 | 10/2001 |
| WO | WO 2004/025803 A1 | 3/2004 |

OTHER PUBLICATIONS

Rodriguez-Amenedo, Jose Luis, et al. (2002). "Automatic General Control of a Wind Farm With Variable Speed Wind Turbines," *IEEE Transactions on Energy Conversion*, vol. 17, No. 2: pp. 279-284.

Ledesma, Pablo, et al. (2002). "Contribution of Variable-Speed Wind Turbines to Voltage Control," *Wind Engineering*, vol. 26, No. 6: 347-358.

* cited by examiner

WIND PARK WITH ROBUST REACTIVE POWER ADJUSTMENT SYSTEM AND METHOD FOR THE OPERATION THEREOF

REFERENCE TO RELATED APPLICATIONS

This application is a national stage filing under 35 USC 371 of International Application No. PCT/EP2005/010606, filed Sep. 30, 2005, which claims Convention priority from German Patent Application Nos. 10 2004 048 341.8, filed Oct. 1, 2004, the full disclosures of all of which are incorporated herein by reference.

FIELD OF THE INVENTION

The invention relates to a windpark having at least two wind energy installations, which each have a rotor, a generator driven by it and a control device, and which are connected via connecting lines to a main line, a linking point which connects the main line to a power transmission network and a parkmaster, which is designed for power factor control and has communication lines for transmission of control signals to the wind energy installations. The invention also relates to a method for operating such a windpark

BACKGROUND OF THE INVENTION

The development in the field of wind energy installations is characterized by a size trend. This relates not only to the individual wind energy installation, but also to windparks, which are formed from ever greater numbers of wind energy installations that are becoming ever larger. The installed power, which is therefore rising to a major extent, is currently leading to difficulties in the on-shore area where most windparks, and in particular large windparks, are located, owing to the restricted capacity of the power transmission network. In order to allow an adequate supply quality to be maintained, windparks are subject to increasingly more stringent requirements for network compatibility.

One important criterion for safe operation on the network is voltage stability. This is even more important for high feed powers, that is to say in particular for windparks which are connected to high-voltage and extra-high-voltage networks. It is known that it is advantageous to feed a wattless component (in particular a capacitive wattless component) into the network, in order to support the voltage level. Further important criteria are the transmission capability of the networks, such as the current load capacity, connection criteria such as mains flicker, and other effects, such as network losses.

It is known for a measurement point for the volt-amperes to be provided at a point where the windpark is linked to the network, and for this to be compared with nominal presets for the power factor, by means of a windpark host computer (parkmaster) (EP-A-1 519 040, WO-A-01/73518). The parkmaster uses this to determine power factor or wattless-component nominal values for the individual wind energy installations. These implement the requirements by producing a greater or lesser wattless component. However, this results in a change in the voltages and currents on the lines and transformers in the windpark. A similar concept with distributed regulation has been proposed in EP-A-1 512 869. The known concepts have the disadvantage that, particularly in the case of wind energy installations which are located at the end of a long line in the windpark, undesirable voltage rises can occur, leading to instabilities. This can result in undesirable disconnection of individual wind energy installations, or even damage to converters.

SUMMARY OF THE INVENTION

The invention is based on the object of improving a windpark of the type mentioned initially and an operating method so as to achieve better network support.

According to the invention, the object is achieved by the features of the invention as broadly described herein. Advantageous developments are the subject matter of the preferred embodiments.

According to the invention, in a windpark having at least two wind energy installations which each have a rotor, a generator driven by it and a control device, and which are connected via connecting lines to a main line, having a linking point which connects the main line to a power transmission network, and having a parkmaster, which is designed for power factor control and has communication lines for transmission of control signals to the wind energy installations, provision is made for the power-factor control to be in the form of a distributed regulator, having a higher-level regulator at the parkmaster which is designed to determine a nominal voltage (Unom) in order to set a global power coefficient for the power which is emitted to the power transmission network, and to emit this as a signal via the communication lines, and lower-level regulators at the wind energy installations, which are in each case designed to calculate local wattless-component nominal values from the signal for the nominal voltage, to detect the actual emitted voltage from the wind energy installation, and to correct the local wattless-component nominal values after comparison with the nominal voltage (Unom).

The invention is based on the idea of coupling the setting of the desired power coefficient to a voltage maintenance method. Distributed regulation is provided for this purpose. In order to maintain a specific power coefficient, with respect to the power transmission network (network), the parkmaster presets a specific nominal voltage for the individual wind energy installations. This is calculated by the higher-level regulator such that the desired (global) power coefficient is set efficiently for the network. The nominal voltage is emitted as a signal, and is applied via the communication lines to the lower-level regulators for the individual wind energy installations. On the basis of the signal for the nominal voltage, the lower-level regulators autonomously determine local wattless-component nominal values. The generators are operated by means of the control device so as to generate power and a wattless component in accordance with the requirements. The output voltage is measured, and is fed back to the lower-level regulator in a closed control loop. The control devices for the individual wind energy installations therefore set the desired nominal voltage, as far as possible. The higher-level regulator at the parkmaster determines the actually resultant overall power coefficient, and if necessary corrects the nominal voltage for the lower-level regulators.

A number of the expressions that are used will be explained in the following text:

The expression "power coefficient" should be understood as meaning a parameter which describes the wattless component that is required for the respective power. In the relatively narrow sense, this includes the power factor cos φ and its variants tan φ, sin φ and the angle φ itself, but in the wider sense also preset values for the wattless component $Q_v$ and a desired network voltage $U_{VN}$. The latter is expedient in particular for relatively large power stations which are connected directly to the high-voltage network. In a situation such as this, a so-called wattless-component characteristic is provided in the windpark, by means of which appropriate preset values for the required wattless component and for the power coefficients are determined from the preset value for the desired network voltage.

A generator should be understood to be a machine which converts mechanical energy to electrical energy. This covers not only direct-current machines but also single-phase or polyphase alternating-current machines. These machines may also be synchronous or asynchronous machines, which may be single-fed or double-fed. The generator generally, but not necessarily, has a converter. The converter may be in the form of a full converter or a partial converter. Any desired type may be used, and in particular the converter may be in the form of a direct converter or an intermediate-circuit converter.

The expression a windpark should be understood as meaning a total entity which is formed from at least two wind energy installations and a central control device. The latter is referred to as the parkmaster and monitors the behavior of the entire windpark with respect to the power supply network to which the windpark is connected. It influences the operation of the individual wind energy installations to carry out this function.

The global power coefficient relates to the power emitted from the windpark as an entity to the network, the local power coefficient relates to the power emitted from the individual wind energy installation, possibly including associated compensation installations.

The invention has identified the fact that the stability of the operating behavior of a wind-park can be improved considerably if the parkmaster presets nominal voltages for the individual wind energy installations, and it is left to the control devices for the individual wind energy installations to ensure, on the basis of this, appropriate local wattless component presets, and their implementation, so as to achieve the desired power coefficient, overall, at the linking point.

The invention results in considerable advantages:

Firstly, the voltage is controlled at the individual wind energy installations. The maximum possible wattless components of the individual wind energy installations can thus be called up without any problems. There is no risk of instabilities or damage to components occurring, since no damaging voltage discrepancies occur. Safety reductions are not required, or are required only to a reduced extent.

Secondly, the problem of a new cos φ being calculated in the event of pulsed voltage changes in the network (spikes) but it no longer being possible to transmit this quickly enough to the individual wind energy installations, owing to the restricted communication speed, so that these wind energy installations still attempt to follow the spike using the old cos φ, as in the case of the previous concepts, no longer occurs. Thanks to the invention, the individual wind energy installations respond correctly even in the event of rapid processes such as these, and remain at the selected wattless component nominal value.

Thirdly, despite presetting a specific nominal value for the power coefficient at the linking point, the power coefficient for the individual wind energy installations does not need to be predetermined individually and precisely in each case. The respectively correct ratio of the power coefficient to the wattless component is set automatically there, thanks to the lower-level regulator. This also results in the windpark having a robust response to an incorrect response or to an inadequate supply of wattless component of individual wind energy installations.

The invention therefore combines advantages relating to the robust and rapid response, in an elegant form.

The higher-level regulator expediently has a compensation device for the connecting lines to the wind energy installations. This makes it possible to take account of influences caused by the connecting lines, possibly including the main line and/or intermediate transformers, in the calculation of the nominal voltage. This is important because changes in the (nominal) voltages on the connecting lines also affect other relationships relating to the voltage drop over the connecting lines etc.

According to one preferred embodiment, the higher-level regulator has a correction-value memory which contains individual correction values for the wind energy installations, in particular section parameters, for the connecting lines. This makes it possible to take account of differences in the (complex) section parameters. The nominal value can be individually matched to the respective transmission line, with its electrical parameters, for each wind energy installation. This is a major advantage, particularly in the case of windparks having a plurality of wind energy installations arranged in series on one line. Other correction values can also be included individually for each wind energy installation. This results in better control of the individual wind energy installations even in the event of an electrically highly different behavior of the individual wind energy installations with the parkmaster.

It will frequently be adequate to store predetermined values in the correction-value memory. However, an adaptive identification device is advantageously provided for the individual correction values, in particular the section parameters, optionally also interacting with the compensation device. This means that there is no longer any need for the user to actively preset values. This is a considerable advantage, especially in the case of windparks which are difficult to define because of their topology. Furthermore, this results in the correction values being automatically matched to gradual changes resulting from environmental influences or component ageing.

The linking point is expediently arranged on the high-voltage network, and is connected to the main line via a high-voltage transformer. This is a good approach for network connection, particularly for windparks with a high installed rating. However, it results in the disadvantage that high-voltage lines have a so-called natural rating for optimum operation because their capacitances are not negligible—in contrast to the situation with medium-voltage lines. Any discrepancies must be compensated for as appropriate by the wattless component. It is advantageous for the measurement point to be arranged on the high-voltage side of the transformer, for this purpose. However, this involves complex and expensive high-voltage measurement devices. It is therefore preferable for the measurement devices to be arranged on the main-line side of the high-voltage transformer. Provided that the transmission characteristics of the high-voltage transformer are known, this makes it possible to user lower-cost sensors.

The distributed regulator is preferably designed such that its control response has a time constant which is considerably longer than that of pulsed, short voltage fluctuations (voltage transients). This has the advantage that pulsed short voltage fluctuations have no influence on the regulator. Furthermore, this makes it possible to design the lower-level regulator such that it can react quickly to disturbances. This maintains a robust windpark operational response even in disturbed conditions.

In one proven embodiment, the distributed regulator has a limiting device for the nominal voltage. This ensures that excessively high nominal voltages do not cause any damage to the generator or its converter. This is particularly important for those wind energy installations which are connected to a relatively long connecting line. In this case, the complex impedance of the connecting line results in the voltage level not being the same as that of the parkmaster, and in particular it may be higher. Without limiting, damage could easily occur, and this is prevented by the limiting. The limiting device is expediently provided at each lower-level regulator. This allows improved individual matching to the individual wind energy installations. However, an arrangement can also be provided at the higher-level regulator.

A return channel leading from the lower-level regulator to the higher-level regulator is expediently provided for signal feedback, transmitting any overload signal emitted from the lower-level regulator. This results in a signal being passed to the higher-level regulator when a wind energy installation cannot supply a desired wattless component. The higher-level regulator is therefore able to implement appropriate compensation measures with respect to the other wind energy installations.

Additional phase shifters are preferably provided, and may be designed in various ways, that are known per se. Capacitor banks at the wind energy installations have been proven. On the one hand, they result in an increased control range for wattless-component provision. On the other hand, it is possible to reduce the frequency at which the distributed regulator has to switch. This allows the windpark to be operated in a material-conserving manner.

The invention also relates to a corresponding method. Reference should be made to the above statements, for a more detailed description.

BRIEF DESCRIPTION OF THE DRAWINGS

The invention will be explained in more detail in the following text with reference to the drawing, in which one advantageous exemplary embodiment is illustrated, and in which.

DETAILED DESCRIPTION OF THE INVENTION

Figure 1:
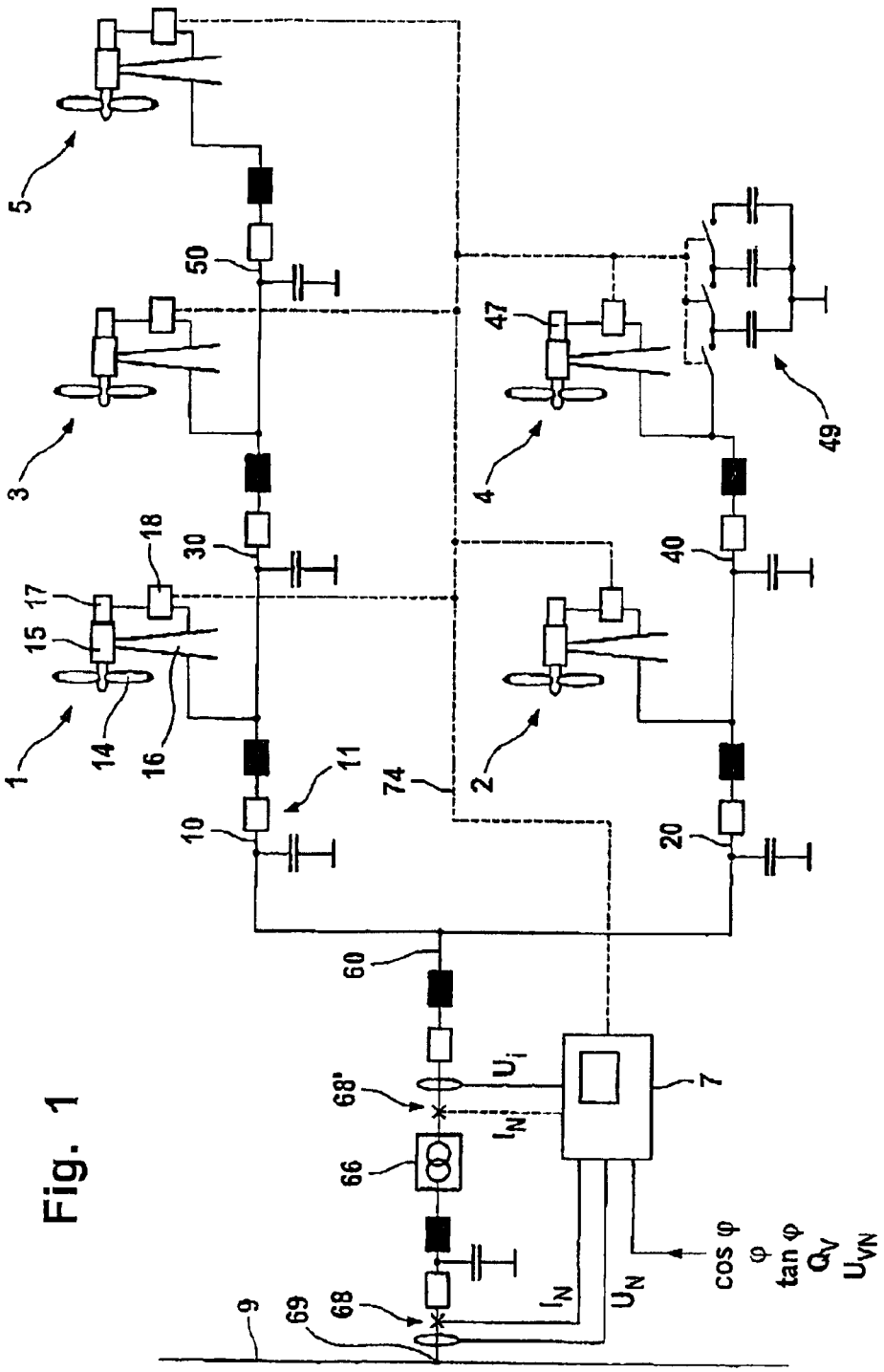
FIG. 1 shows a schematic illustration of one exemplary embodiment of a windpark according to the invention, with a parkmaster and wind energy installations.

FIG. 1 illustrates one exemplary embodiment of a windpark according to the invention, which has a total of five wind energy installations (1-5) and one central host computer (parkmaster) 7 in the illustrated exemplary embodiment. The wind energy installations 1-5 are connected to one end of a main line 60 via connecting lines 10, 20, 30, 40, 50.

The design of the wind energy installations 1-5 will be explained using the wind energy installation 1 as an example. The wind energy installation 1 has a rotor 14 which is arranged on a machine housing 15 at the top of a tower 16 such that it can rotate. The rotor 14 drives a generator (not illustrated). This is preferably a double-fed asynchronous generator, although other types are also possible. The generator is connected to a converter 17, which converts the electrical power produced by the generator to three-phase electrical power at a fixed frequency (network frequency). The operation of the wind energy installation 1 is monitored by a control device 18, which controls the individual components of the wind energy installation 1 via suitable control lines (which are not illustrated). A transformer (not illustrated) is also provided for the wind energy installation 1, and transforms the voltage emitted from the converter 17 to a higher level.

The electrical energy which is produced by the wind energy installation 1 is passed to the main line 60 via the connecting line 10, which is shown with its electrical equivalent circuit in FIG. 1. This has in each case one inductance, impedance and capacitance, illustrated as a concentrated element. These are annotated in a combined form as the complex impedance 11. The connecting line 10 of the wind energy installation 1 is directly connected to the one end of the main line 60. That wind energy installation 3 that is the next arranged on this branch is connected to the main line 60 via its connecting line 30 and then via the connecting line 10. The wind energy installation 5 is connected in a corresponding manner to the main line 60 via its connecting line 50 and the connecting lines 30 and 10.

A power distribution network (network) 9 of a power supply organization is connected to the other end of the main line 60 via a linking point 69. The linking point 69 is used for feeding in the electrical power that is produced by the wind energy installations 1-5 and is fed to the main line 60. Depending on the configuration of the windpark, the main line 60 may have a considerable length. This may be several kilometers, or even more than 50 km, in the case of offshore windparks. In the illustrated exemplary embodiment, the network 9 is a high-voltage network. A high-voltage transformer 66 is provided in order to raise the voltage, which is at the medium-voltage level, on the main line 60.

Figure 2:
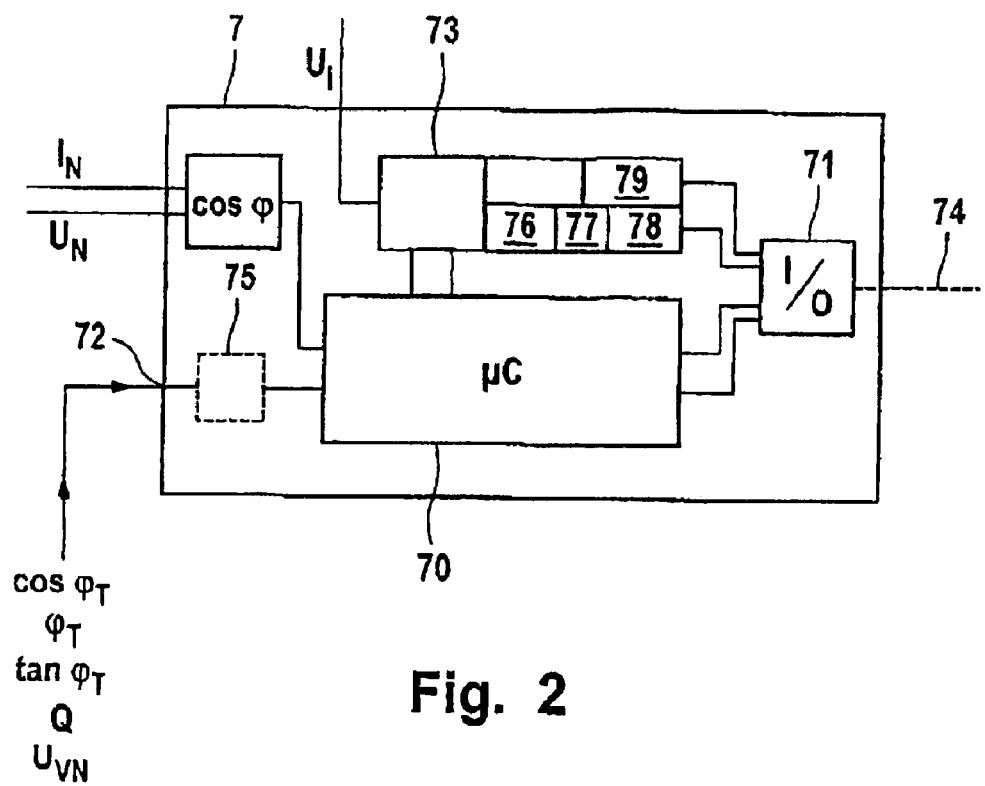
FIG. 2 shows a schematic illustration of the parkmaster with a higher-level regulator based on the exemplary embodiment illustrated in FIG. 1.

The parkmaster 7 is provided in order to monitor the electrical power fed in to the network 9, and carries out a control function for the wind energy installations 1-5. The parkmaster 7 comprises a host computer 70, an input/output unit 71 and a higher-level regulator 73 as a component of the distributed control system according to the invention. Control strategies for the windpark are implemented in the host computer 70 while, in addition, it has an input 72 for control instructions from the operator of the power supply organization network 9. This is illustrated in FIG. 2, in the form of an example, by an input for a desired power coefficient ($\phi$, cos $\phi$, tan $\phi$, wattless-component Q or network voltage preset value $U_{VN}$). If, as is normal in the case of high-voltage networks, the power coefficient is set by means of the network voltage preset value, a wattless, component characteristic module 75 is also provided. This contains a predeterminable characteristic, which relates the preset voltage to a wattless component level. Furthermore, the parkmaster 7 is connected to measurement devices 68 for the power emitted to the network, and/or for the power coefficient. In the illustrated exemplary embodiment, these measurement devices 68 comprise a voltage sensor for the network voltage Un and a current sensor for the current In fed into the network. However, it is also possible to provide for the measurement device to be partially (68') or completely arranged on the main-line side of the high-voltage transformer 66. This has the advantage that it is possible to use simpler sensors, designed for the medium-voltage level.

Figure 3:
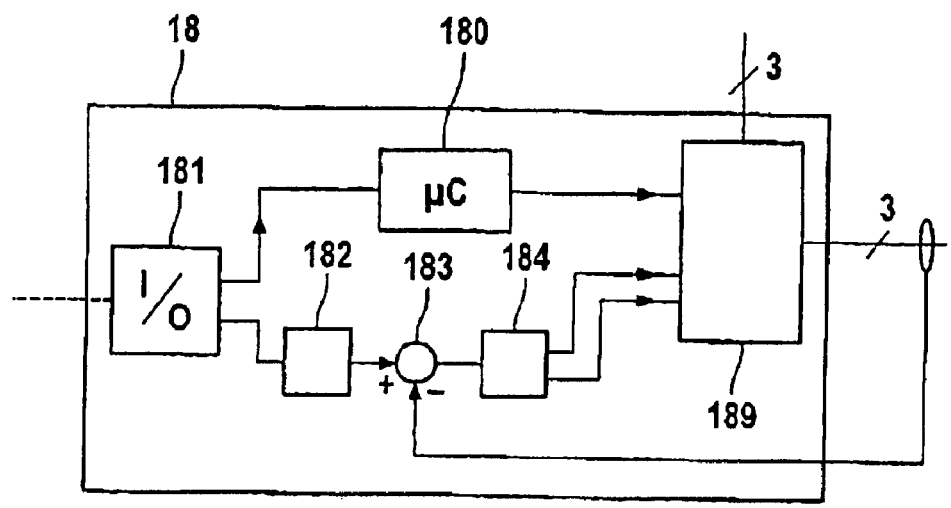
FIG. 3 shows a schematic illustration of a control device for the wind energy installation, with a lower-level regulator based on the exemplary embodiment illustrated in FIG. 1.

The major components of the distributed control system according to the invention are the higher-level regulator 73 at the parkmaster 7, and the lower-level regulators of the individual wind energy installations 1-5. The higher-level regulator 73 uses the desired power coefficient to determine a value for the nominal voltage Unom on the main line 60. This value is transmitted via the input/output device 71 and the communication lines 74 to the lower-level regulators for the control devices for the individual wind energy installations 1-5. The design and method of operation of the control devices will be explained in the following text using the example, as illustrated in FIG. 3, of the control device 18 for the wind energy installation 1.

The control device 18 has an input/output unit 181, an operational control unit 180, a limiting device 182 and a lower-level regulator 184 as well as a converter drive 189. The input/output unit 181 is connected to the communication lines 74. Presets and control commands transmitted from the parkmaster 7 are passed, depending on the signal, to the operational control unit 180 and/or the lower-level regulator 184. The signal for the nominal voltage Unom is passed via the limiting device 182. This is designed to limit excessive values to a level that is still permissible. Furthermore, it is applied via a subtraction point 183 to the lower-level regulator 184, which uses the signal for the nominal voltage Unom to calculate suitable drive signals for the converter drive 189. The drive signals are modified, if necessary, by suitable measures, for example filters, in order to avoid mutual interference between the lower-level regulators for a plurality of wind energy installations. In the illustrated exemplary embodiment, the nominal voltage is passed on as a signal for the output voltage of the converter 17 (other variables may also be used, for example the wattless component). The operational control unit 180 in the exemplary embodiment emits a signal for the nominal power to the converter driver 189. The converter 17 is operated by the converter drive 189, in a manner known per se, in accordance with the selected drive signals. At its output, it produces electrical power P and wattless component Q for an output voltage U on the basis of the selected values, and feeds these to the connecting line 10. The output voltage is measured, and is fed back to the subtraction point 183. Any discrepancies from the nominal value Unom can thus be regulated out—the wind energy installations 2-5 in the windpark are operated in a corresponding manner.

The connecting lines 10, 20, 30, 40, 50 have complex impedances. Changes in the voltage emitted from the wind energy installations also lead to changes in the voltage drop over the connecting lines 10, 20, 30, 40, 50. In order to compensate for disturbance influences resulting from this, a compensation device 77 is provided at the upper-level regulator 73. This varies the calculated nominal voltage on the basis of the voltage drop expected across the complex impedance 11. This reduces the influence of the connecting lines 10, 20, 30, 40, 50 on the distributed control system. Since the individual wind energy installations 1-5 are arranged at different locations on the connecting lines, each of the wind energy installations have different complex impedances with respect to the main line 60. This leads to the voltage relationships at individual wind energy installations 1-5 differing from one another. This results in a high voltage drop over the connecting lines 10, 30, 50, in particular for the wind energy installation 5 that is located at the rear. This conceals the risk of the output voltage from the wind energy installation 5 reaching an unacceptably high value, if an identical value is preset for the nominal voltage Unom. A correction-value memory 78 is provided in order to counteract this. The voltage drops which result from the different complex impedances of the connecting lines 10, 20, 30, 40, 50 are individually taken into account in this memory for each of the wind energy installations 1-5. The appropriate correction value can thus be used to modify the nominal voltage Unom so as to compensate for the influence of the respective connecting line to the individual wind energy installation. The respective correction values are determined by an adaptive identification device 76, using an identification method or methods, and are written to the correction-value memory 78. This results in valid correction values being determined even when the conditions of the connecting lines are varying slowly (for example as a result of ageing or environmental influences) or it is difficult to calculate them, because of the topology.

Capacitor banks 49 are optionally arranged at the wind energy installations. Only one, for the wind energy installation 4, is illustrated in FIG. 1, for clarity reasons; they can be provided in corresponding form at the other wind energy installations as well. These offer an additional capability for the provision of a wattless component. This widens the operating range for the distributed control system according to the invention. Furthermore, the capacitor banks 49 allow rough presetting of the wattless component. A phase-shifter switching device 79 is provided at the higher-level regulator 73 for operation of the capacitor banks 49, and may be in the form of a low-pass or moving-average filter. This means that the number of switching processes to be carried out by the converter 47 for matching of the wattless component is reduced. This has a positive effect on the system response (in particular mains flicker) and life.

The invention claimed is:

1. A windpark, comprising:
   at least two wind energy installations, each of which installations comprises a rotor, a generator driven by the rotor and a control device, and which are connected via connecting lines to a main line,
   the windpark further comprising a linking point which connects the main line to a power transmission network, a parkmaster which is configured for power factor control and has communication lines for transmission of control signals to the wind energy installations, and a distributed regulator comprising
      a higher-level regulator located at the parkmaster which is configured to determine a nominal voltage in order to set a global power coefficient for the power which is emitted to the power transmission network and to emit the nominal voltage as a signal via the communication lines and
      a lower-level regulator at each of the wind energy installations which is configured to calculate a local wattless-component nominal value from the signal for the nominal voltage, to detect an actual emitted voltage from the wind energy installation and to correct the local wattless-component nominal value after comparison with the nominal voltage.

2. The windpark of claim 1, wherein the higher-level regulator comprises a compensation device for the connecting lines.

3. The windpark of claim 1 or 2, wherein the higher-level regulator has a correction-value memory which includes individual correction values for the wind energy installations including section parameters for the connecting lines.

4. The windpark of claim 3, further comprising an adaptive identification device provided for the individual correction values.

5. The windpark of claim 1 or 2, wherein the linking point is arranged on the power transmission network and is connected to the main line via a high-voltage transformer.

6. The windpark of claim 5, further comprising a measurement device arranged on the main-line side of the high-voltage transformer.

7. The windpark of claim 1 or 2, wherein a control response of the distributed regulator has a time constant which is longer than that of voltage transients.

8. The windpark of claim 1 or 2, wherein the distributed regulator has a limiting device for the nominal voltage.

9. The windpark of claim 8, wherein the limiting device is provided at at least one lower-level regulator.

10. The windpark claim 1 or 2, further comprising additional passive phase shifters.

11. The windpark of claim 10, wherein capacitor banks are provided as phase shifters for the wind energy installations.

12. The windpark of claim 2, further comprising an adaptive identification device provided for the compensation device.

* * * * *

UNITED STATES PATENT AND TRADEMARK OFFICE
CERTIFICATE OF CORRECTION

| | |
|---|---|
| PATENT NO. | : 7,606,638 B2 |
| APPLICATION NO. | : 11/664460 |
| DATED | : October 20, 2009 |
| INVENTOR(S) | : Jens Fortmann et al. |

It is certified that error appears in the above-identified patent and that said Letters Patent is hereby corrected as shown below:

On the Title page:

Under Item (87) PCT No., please replace "PCT/EP2005/001060" with --PCT/EP2005/010606--.

Under Item (30) Foreign Application Priority Data, please replace "10 2004 048 341" with --10 2004 048 341.8--.

Signed and Sealed this

Twenty-sixth Day of January, 2010

David J. Kappos
*Director of the United States Patent and Trademark Office*